US010345584B2

United States Patent
Yokota et al.

(10) Patent No.: US 10,345,584 B2
(45) Date of Patent: Jul. 9, 2019

(54) LIQUID CRYSTAL DISPLAY AND HEAD-UP DISPLAY DEVICE

(71) Applicant: TOPPAN PRINTING CO., LTD., Tokyo (JP)

(72) Inventors: Michio Yokota, Hino (JP); Yayoi Nakamura, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/800,714

(22) Filed: Nov. 1, 2017

(65) Prior Publication Data

US 2018/0067311 A1 Mar. 8, 2018

Related U.S. Application Data

(63) Continuation of application No. PCT/JP2016/062805, filed on Apr. 22, 2016.

(30) Foreign Application Priority Data

May 11, 2015 (JP) ................... 2015-096676

(51) Int. Cl.
*G02F 1/1362* (2006.01)
*G02F 1/1333* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC .. G02F 1/133512; G02F 1/136; G02F 1/1368; G02F 1/136209; G02F 1/136213;
(Continued)

(56) References Cited

U.S. PATENT DOCUMENTS

2003/0063249 A1 4/2003 Hoshino et al.
2005/0122447 A1 6/2005 Shiota et al.
(Continued)

FOREIGN PATENT DOCUMENTS

CN 104216188 A 12/2014
JP 2001-305580 10/2001
(Continued)

OTHER PUBLICATIONS

English Language Translation of the International Preliminary Report on Patentability dated Nov. 23, 2017 in corresponding International Patent Application No. PCT/JP2016/062805.
(Continued)

*Primary Examiner* — Thoi V Duong

(57) ABSTRACT

A liquid crystal display includes: a first substrate and a second substrate which face each other and which are provided such that light emitted from a light source is obliquely incident on a surface of each of the first and second substrates; a liquid crystal layer provided between the first substrate and the second substrate; a switching element provided on the first substrate and including a gate electrode; a first light-shielding film provided above the switching element, with a first insulating layer interposed; a pixel electrode provided above the first light-shielding film, with a second insulating layer interposed; and a second light-shielding film provided on the second substrate and in a boundary region between adjacent pixels, and located above the switching element.

9 Claims, 13 Drawing Sheets

(51) Int. Cl.
    *G02F 1/1343* (2006.01)
    *G02B 27/01* (2006.01)
    *G02F 1/1368* (2006.01)
    *B60K 35/00* (2006.01)
    *G02B 5/00* (2006.01)
    *G02B 5/20* (2006.01)

(52) U.S. Cl.
    CPC ...... *G02F 1/1368* (2013.01); *G02F 1/133345* (2013.01); *G02F 1/136209* (2013.01); *B60K 2350/2052* (2013.01); *G02B 5/003* (2013.01); *G02B 5/201* (2013.01); *G02B 2027/0118* (2013.01); *G02F 2201/123* (2013.01)

(58) Field of Classification Search
    CPC ......... G02F 1/136286; G02F 1/133345; G02F 1/134309; G02F 1/133526; G02F 1/133528; G02F 1/133514; G02F 1/1343; G02F 1/134336; G02F 1/1333; G02F 1/1336; G02F 1/1335; G02F 1/133711; G02F 1/133308; G02F 1/133553; G02F 1/133603; G02F 1/1362; G02F 1/136277; G02F 1/133602; G02F 2201/123; G02F 2201/08; G02F 2001/133302; G02F 2001/133357; G02F 2001/133562; G02F 2001/133314; G02F 2001/133317; G02F 2001/133354; G02F 2001/13356; G02F 2001/133607; G02F 2001/133618; G02F 2001/133623; H01L 29/78633; H01L 29/786; H01L 51/5284; H01L 51/0096; H01L 51/5275; H01L 27/3244; H01L 27/3276; H01L 27/3272; G02B 27/01; G02B 27/0101; G02B 5/003; G02B 6/0031; G02B 6/0073; G02B 6/0088
    See application file for complete search history.

(56) References Cited

U.S. PATENT DOCUMENTS

2010/0091212 A1   4/2010   Moon et al.
2016/0216553 A1   7/2016   Otani

FOREIGN PATENT DOCUMENTS

| JP | 2007-171867 | 7/2007 |
| JP | 2008-152158 | 7/2008 |
| JP | 2010-093234 A1 | 4/2010 |
| JP | 2010-211065 | 9/2010 |
| JP | 2013-109258 | 6/2013 |
| JP | 2015-79227 | 4/2015 |
| TW | I227807 | 2/2005 |
| WO | WO 2015/056792 A1 | 4/2015 |

OTHER PUBLICATIONS

International Search Report dated Jul. 19, 2016 in corresponding International Patent Application No. PCT/JP2016/062805.
Written Opinion of the International Searching Authority dated Jul. 19, 2016 in corresponding International Patent Application No. PCT/JP2016/062805.
Taiwanese Office Action dated Feb. 13, 2017 in corresponding Taiwanese Patent Application No. 10620141120.
Extended European Search Report dated Dec. 10, 2018 in corresponding European Patent Application No. 16792521.3.
Korean Office Action dated Jan. 15, 2019 in Korean Patent Application No. 10-2017-7032863 (5 pages) (5 pages English Translation).
Japanese Office Action dated Mar. 19, 2019 in Japanese Patent Application No. 2015-096676 (5 pages) (6 pages English Translation).

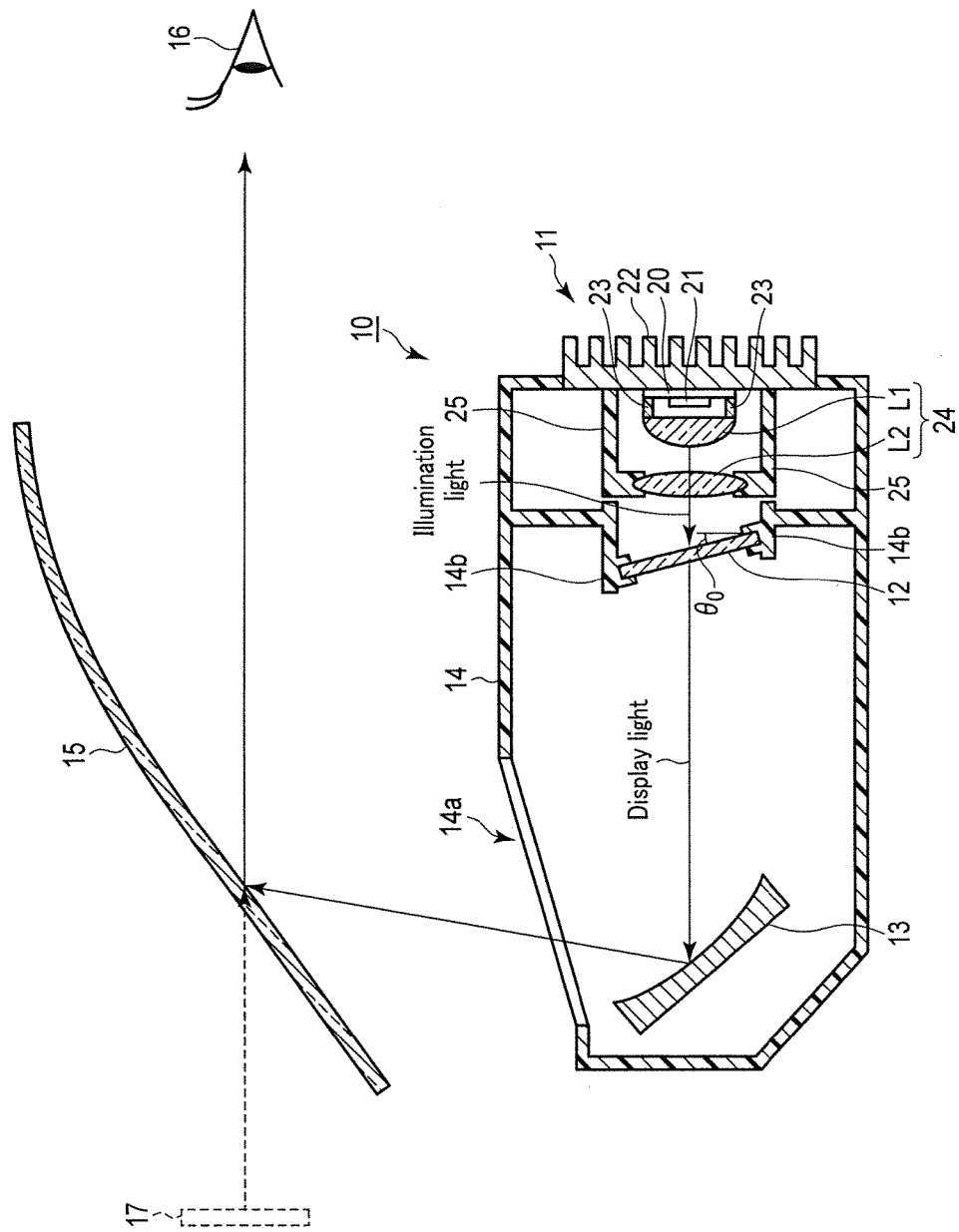
F I G. 1

Illumination light

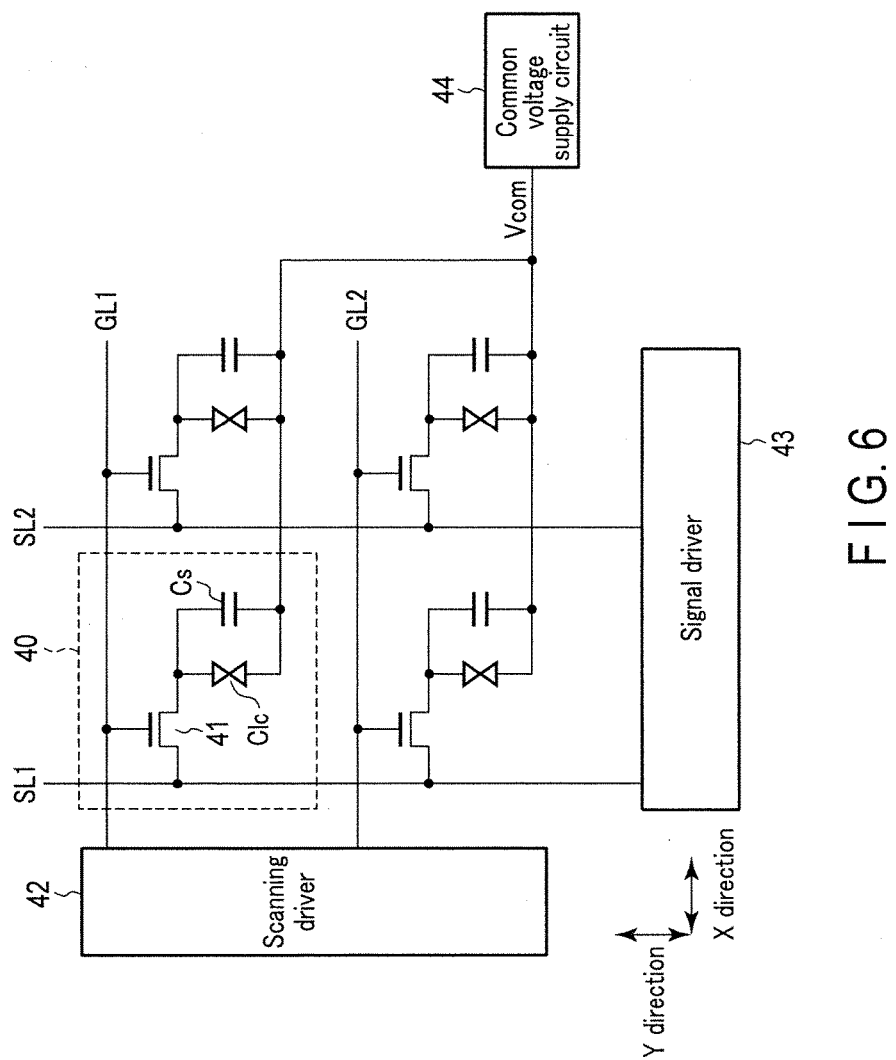
F I G. 6

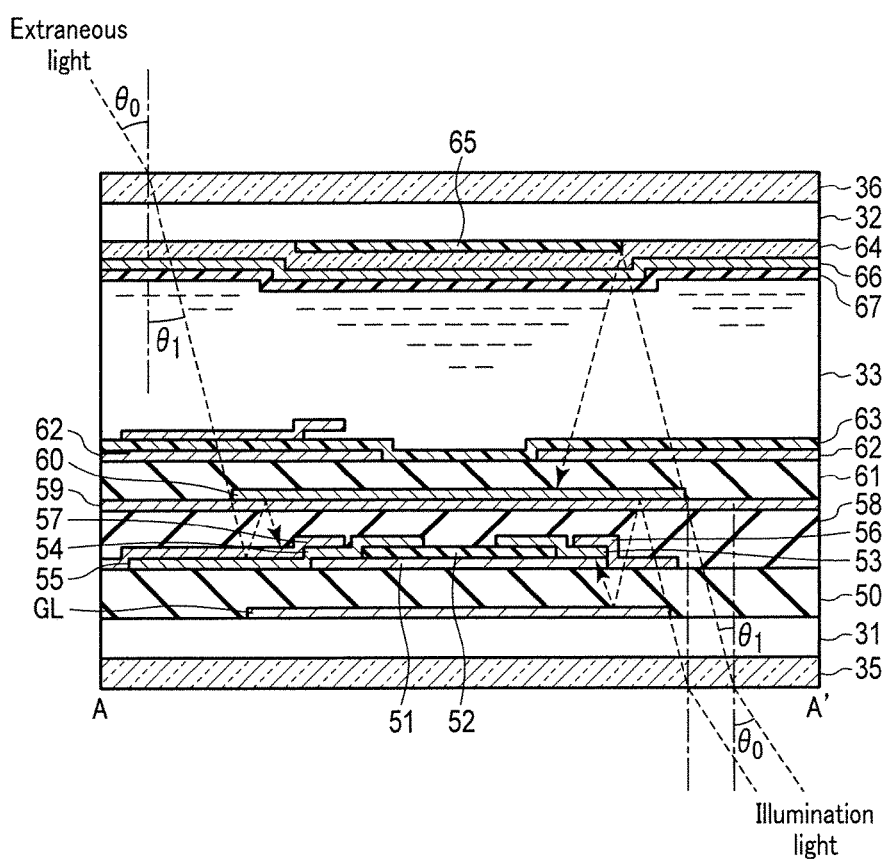
F I G. 10

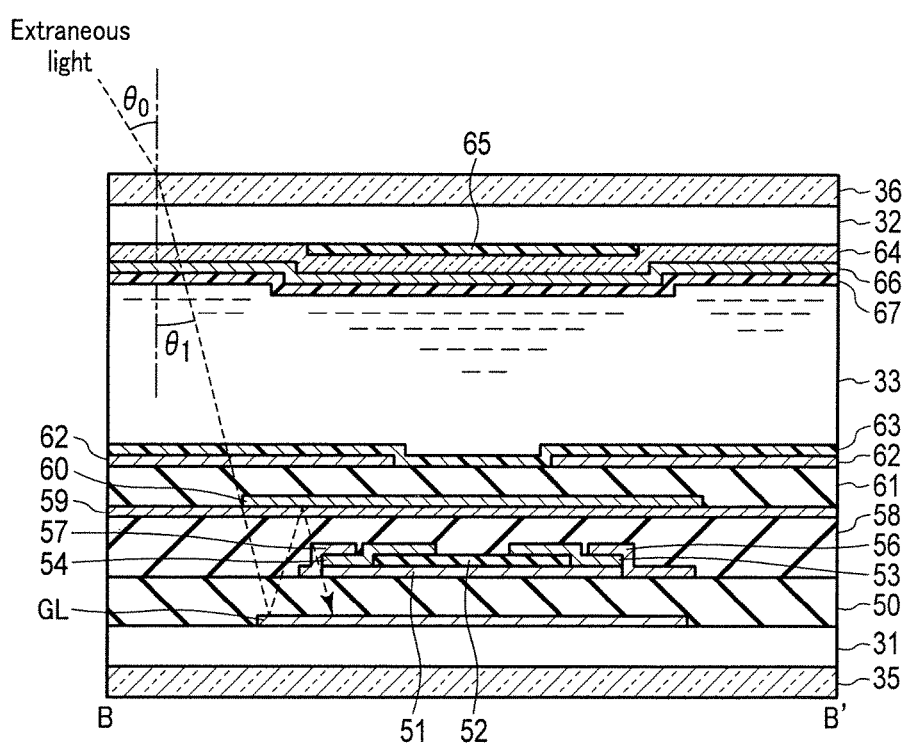
F I G. 11

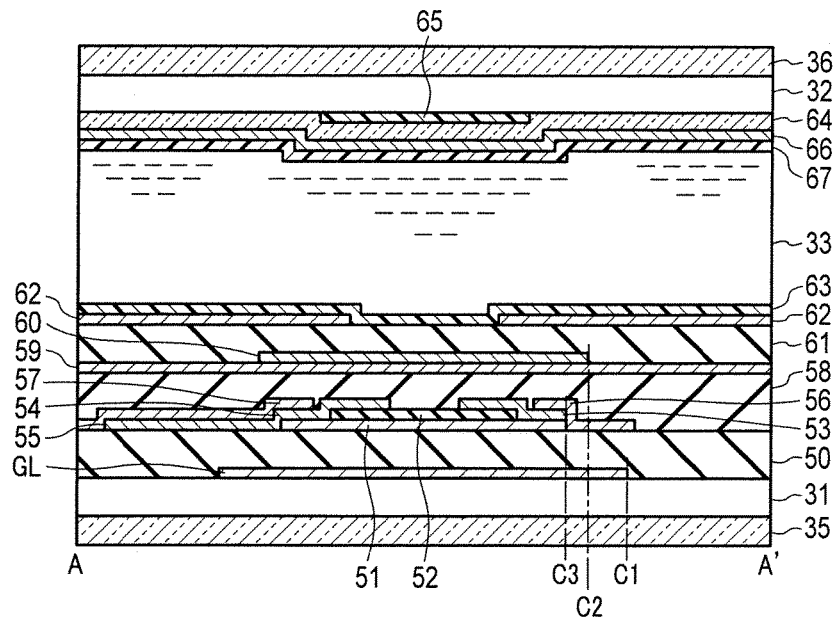
F I G. 13
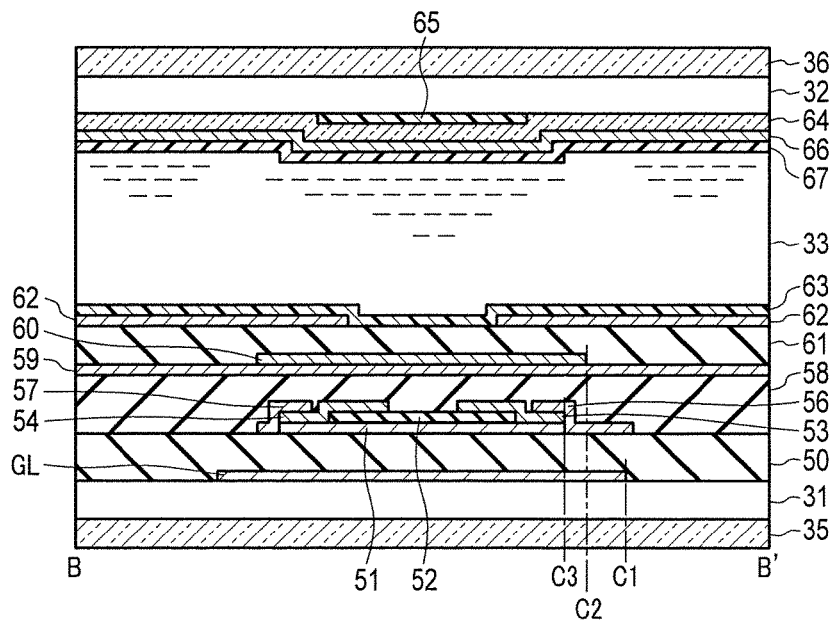
F I G. 14

| Incidence angle $\theta_0$ | Refraction angle $\theta_1$ | |
|---|---|---|
| | $n=1.5 (\theta_{11})$ | $n=1.8 (\theta_{12})$ |
| 10° | 7° | 6° |
| 15° | 10° | 8° |
| 20° | 13° | 11° |
| 25° | 16° | 14° |
| 30° | 19° | 16° |

LIQUID CRYSTAL DISPLAY AND HEAD-UP DISPLAY DEVICE

CROSS-REFERENCE TO RELATED APPLICATIONS

This application is a Continuation Application of PCT Application No. PCT/JP2016/062805, filed Apr. 22, 2016, and based upon and claiming the benefit of priority from Japanese Patent Application No. 2015-096676, filed May 11, 2015, the entire contents of all of which are incorporated herein by reference.

BACKGROUND OF THE INVENTION

1. Field of the Invention

The present invention relates to a liquid crystal display and a head-up display device.

2. Description of the Related Art

A head-up display (HUD) is known which displays a virtual image by projecting display light from a liquid crystal display onto the windshield of a vehicle. The head-up display reflects the display light, which is illumination light emitted from a backlight and passing through the liquid crystal display, by means of a reflecting mirror, and projects the reflected light onto the windshield or the like. The driver can virtually recognize the virtual image displayed on the windshield, and can read the information without virtually moving the field of vision in the driving condition.

Due to the structure of the head-up display, the light coming from the outside of the vehicle (extraneous light), such as the sunlight, falls on the liquid crystal display employed in the head-up display. In this case, an unnecessary image which should not be displayed may be shown on the windshield due to the extraneous light reflected on the display surface of the liquid crystal display. As a result, the display property of the liquid crystal display may deteriorate.

The liquid crystal display comprises a transistor included in a pixel. If the illumination light from the backlight is incident on the semiconductor layer of this transistor, a photo-leakage current may be generated, causing flickering, display unevenness, or image persistence. As a result, the image quality of the liquid crystal display may deteriorate.

BRIEF SUMMARY OF THE INVENTION

According to an aspect of the present invention, there is provided a liquid crystal display comprising:
 a first substrate and a second substrate which face each other and which are provided such that light emitted from a light source is obliquely incident on a surface of each of the first and second substrates;
 a liquid crystal layer provided between the first substrate and the second substrate;
 a switching element provided on the first substrate and including a gate electrode;
 a first light-shielding film provided above the switching element, with a first insulating layer interposed;
 a pixel electrode provided above the first light-shielding film, with a second insulating layer interposed; and
 a second light-shielding film provided on the second substrate and in a boundary region between adjacent pixels, and located above the switching element.

According to an aspect of the present invention, there is provided a head-up display device comprising:
 a liquid crystal display of the above aspect;
 the light source; and
 a reflective member which projects light having passed through the liquid crystal display onto a display member.

BRIEF DESCRIPTION OF THE SEVERAL VIEWS OF THE DRAWINGS

FIG. 1 is a sectional view of a head-up display device according to an embodiment.
FIG. 6 is a circuit diagram of a pixel array.
FIG. 10 illustrates light incident on the liquid crystal display of the first embodiment.
FIG. 11 illustrates light incident on the liquid crystal display of the first embodiment.
FIG. 13 is a sectional view of the liquid crystal display taken along line A-A' of FIG. 12.
FIG. 14 is a sectional view of the liquid crystal display taken along line B-B' of FIG. 12.

DETAILED DESCRIPTION OF THE INVENTION

Figure 2:
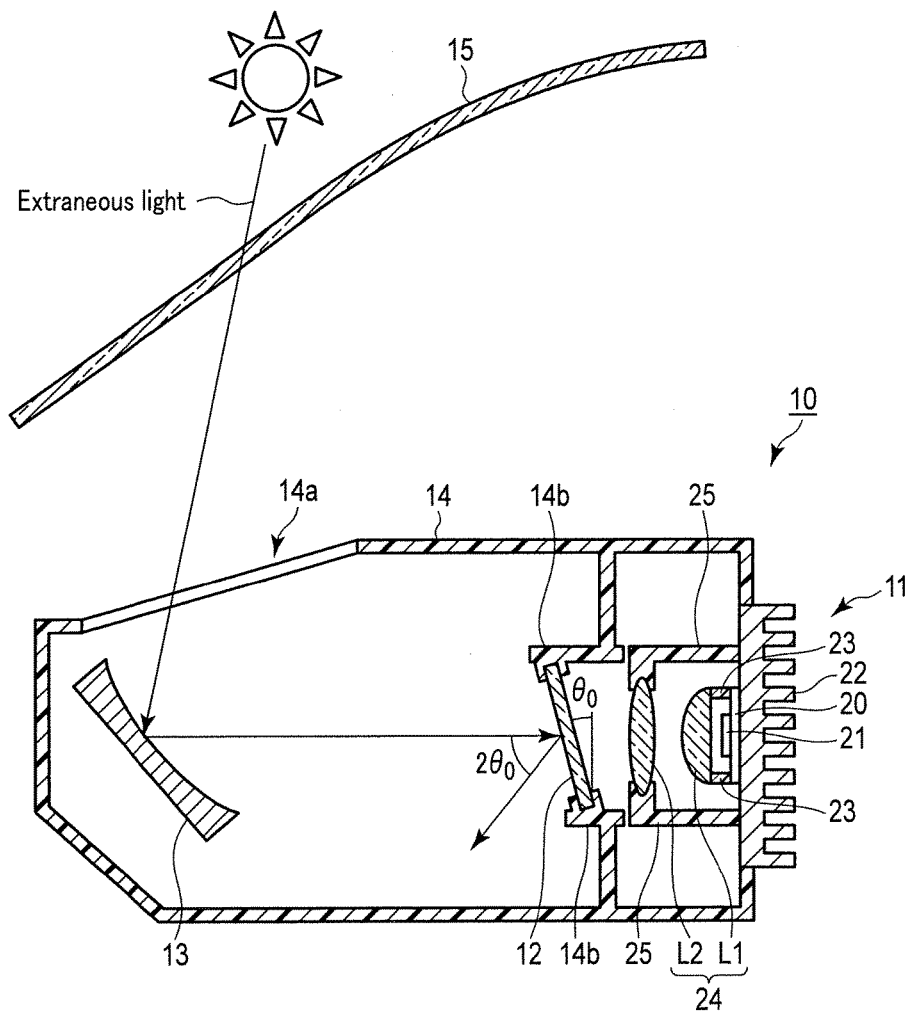
FIG. 2 illustrates extraneous light which is incident on a liquid crystal display.

A description will now be given of the embodiments with reference to the accompanying drawings. It should be noted that the drawings are schematic and illustrate the technical concepts, and the dimensions and scales in the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited to the shapes, structures or arrangements of the constituent elements. In the descriptions given below, structural elements having substantially the same functions and configurations will be denoted by the same reference symbols, and a repetitive description of such elements will be given only where necessary.

[1] Structure of Head-Up Display Device

FIG. 1 is a sectional view of a head-up display device 10 according to an embodiment of the present invention. The head-up display device 10 comprises a light source unit 11, a liquid crystal display 12, a reflective member 13, a case 14 and a display member 15.

The light source unit 11 is, for example, a light source having a planar shape (surface light source), and supplies illumination light to the liquid crystal display 12. The light source unit 11 includes a substrate 20, a light-emitting element 21, a heat sink (heat absorption plate) 22, support member 23, a light source optical system 24, and supporting member (lens holder) 25. One or a plurality of light-emitting elements 21 are provided on the substrate 20. The light-emitting elements 21 are, for example, white light-emitting diodes (LEDs). The substrate 20 is a circuit board on which wirings for supplying power to the light-emitting elements 21 are provided. The heat sink 22 is provided on the bottom surface of the substrate 20 and absorbs or radiates the heat of the light source unit 11.

The light source optical system 24 is provided above the substrate 20. The light source optical system 24 is made, for example, of a plano-convex lens L1 and convex lens (biconvex lens) L2. The plano-convex lens L1 is supported by supporting member 23, and the convex lens L2 is supported by supporting member 25 provided on the heat sink 22. The light source optical system 24 condenses the illumination light emitted from the light-emitting elements 21 and makes it travel in a constant direction. The illumination light traveling from the light source optical system 24 toward the liquid crystal display 12 is a surface light source.

The liquid crystal display 12 is provided on the optical path of the light source unit 11. The liquid crystal display 12 is supported by supporting member 14b provided in the case 14. The liquid crystal display 12 permits the illumination light emitted from the light source unit 11 to pass therethrough, for optical modulation. The liquid crystal display 12 displays an image indicating driving information such as a vehicle speed.

The reflective member (reflecting mirror) 13 is a plane mirror, a concave mirror, or the like. The reflective member 13 reflects the display light from the liquid crystal display 12 toward the display member 15. Where a concave mirror is employed as the reflective member 13, the concave mirror can enlarge the display light from the liquid crystal display 12 with a predetermined magnification.

The display member 15 is a member on which the display light from the liquid crystal display 12 is projected. The display member 15 reflects the display light to the driver 16, and the display light is displayed as a virtual image 17. The information which the driver 16 visually recognizes as the virtual image 17 includes a vehicle speed, an engine speed, a travel distance, navigation information, an outside temperature, etc.

The display member 15 is, for example, the windshield of a vehicle. The display member 15 may be a translucent screen (combiner) exclusively provided for the head-up display device 10. The combiner is used, for example, by arranging it on the dashboard of the vehicle, attaching it to the rearview mirror arranged in front of the driver 16, or attaching it to the sun visor arranged on the upper portion of the windshield. The combiner is made, for example, of a plate-like synthetic resin base member having a curved surface. An evaporation film made of titanium oxide, silicon oxide or the like is formed on the surface of the base member. The evaporation film imparts the translucence function to the combiner.

The case 14 houses the light source unit 11, the liquid crystal display 12 and the reflective member 13. The case 14 has an opening 14a through which the display light reflected by the reflective member 13 passes. A transparent member may be used in place of the opening 14a. The case 14 is received, for example, inside the dashboard.

As shown in FIG. 1, the illumination light emitted from the light source unit 11 passes through the liquid crystal display 12 and is optically modulated. The display light, which has passed through the liquid crystal display 12, is reflected by the reflective member 13 and is projected onto the display member 15. The virtual image (display image) 17, obtained by the projection of the display light onto the display member 15, is visually recognized by the driver 16. As a result, the driver 16 can visually recognize the virtual image 17 that is displayed ahead of the driver's seat such that it is superimposed on the landscape.

On the other hand, part of the extraneous light passes through the display member 15, is reflected by the reflective member 13 and falls on the liquid crystal display 12. The extraneous light includes various kinds of light coming from the outside of the display member 15 (i.e., from the side opposite to that on which the liquid crystal display 12 is arranged). For example, it is such external light as the sunlight. If the display surface (screen) of the liquid crystal display 12 is substantially parallel to the major surface of the light source unit 11 (i.e., the surface from which the illumination light is emitted), that is, if the optical axis of the extraneous light and the display surface of the liquid crystal display 12 are substantially perpendicular to each other, the light reflected by the liquid crystal display 12 travels along the opposite optical path to that of the extraneous light and is projected onto the display member 15. For this reason, an unnecessary image which should not be displayed may be generated, degrading the display quality of the display image to be visually recognized by the driver 16.

Thus, the display surface of the liquid crystal display 12 is tilted by a predetermined tilt angle $\theta_0$ relative to the major surface of the light source unit 11. In other words, the normal line of the display surface of the liquid crystal display 12 is tilted by the predetermined tilt angle $\theta_0$ relative to the optical path of the light source unit 11 (or the optical path of the extraneous light). The tilt angle $\theta_0$ is larger than 0° and not more than 45°. To be more specific, the tile angle $\theta_0$ is not less than 10° and not more than 30°. With this structure, as shown in FIG. 2, the extraneous light is reflected by the liquid crystal display 12 such that the reflected light does not travel in the same direction as the display light of the liquid crystal display 12 but travels in the direction that is inclined by $2\theta_0$ relative to the optical path of the light source unit 11. As a result, the reflected light from the liquid crystal display 12 does not result in the deterioration of the display property.

[2] Structure of Liquid Crystal Display 12

Figure 3:
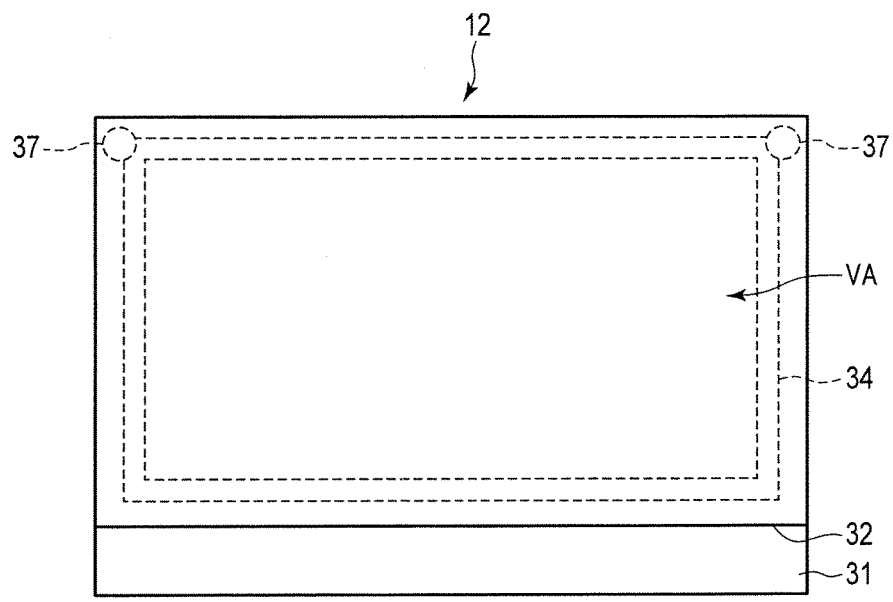
FIG. 3 is a plan view of the liquid crystal display according to an embodiment.
Figure 4:
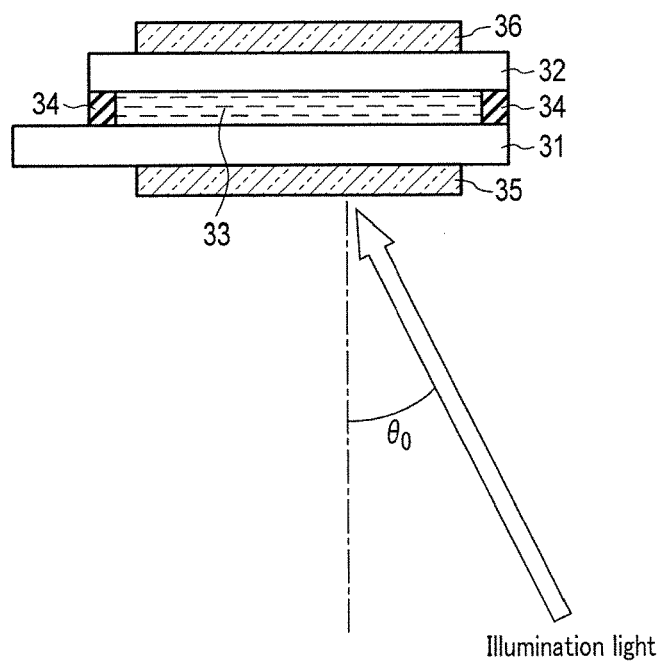
FIG. 4 is a sectional view of the liquid crystal display according to an embodiment.

A description will be given of the structure the liquid crystal display 12. FIG. 3 is a plan view of the liquid crystal display 12 according to the present embodiment. FIG. 4 is a sectional view of the liquid crystal display 12 of the present embodiment.

The liquid crystal display 12 is provided with: a TFT substrate 31 on which a TFT, a pixel electrode, etc. are formed; a color filter substrate (CF substrate) 32 which is arranged to face the TFT substrate and on which a color filter, a common electrode, etc. are formed; and a liquid crystal layer 33 sandwiched between the TFT substrate 31 and the CF substrate 32. The TFT substrate 31 and the CF substrate 32 are made of a transparent substrate (e.g., a glass substrate). The TFT substrate 31 is arranged on the side closer to the light source unit 11, and the illumination light emitted from the light source unit 11 enters the liquid crystal layer 33 from the TFT substrate 31. Of the two major surfaces of the liquid crystal display 12, the major surface which is opposite to the light source unit 11 is a display surface of the liquid crystal display 12.

The liquid crystal layer 33 is made of a liquid crystal material sealed by a seal member 34, by which the TFT substrate 31 and the CF substrate 32 are pasted. The region surrounded by the seal member 34 is the display area VA of the liquid crystal display 12. The optical characteristics of the liquid crystal material vary when the alignment of the liquid crystal molecules is controlled in accordance with the electric field applied between the TFT substrate 31 and the CF substrate 32. Various liquid crystal modes can be used, including the vertical alignment (VA) mode, the twisted nematic (TN) mode, and homogeneous mode. The seal member 34 is formed, for example, of an ultraviolet curing resin, a thermosetting resin or a UV/heat combination type curing resin. In the manufacturing process, the resin is coated on the TFT substrate 31 or the CF substrate 32, and is then cured by ultraviolet irradiation or heating.

Conductive terminals 37 for electrical connection between the TFT substrate 31 and the CF substrate 32 are provided on the TFT substrate 31 and in regions corresponding to the corners of the CF substrate 32. By the conductive terminals 37, the TFT substrate 31 and the CF substrate 32 are electrically connected to each other.

Circular polarizers 35 and 36 are provided such that they sandwich the TFT substrate 31 and the CF substrate 32. Each of the circular polarizers 35 and 36 includes a retardation plate (¼ wavelength plate) and a polarizing plate (linear polarizer).

In the plane perpendicular to the light traveling direction, the polarizing plate has a transmission axis and an absorption axis perpendicular to each other. Of the light whose oscillation planes are in random directions, the linearly-polarized light (linearly-polarized components of light) having oscillation planes parallel to the transmission axis are allowed to pass through the polarizing plate, while the linearly-polarized light (linearly-polarized components of light) having oscillation planes parallel to the absorption axis are absorbed by the polarizing plate. The two polarizing plates are arranged, with their transmission axes being perpendicular to each other. That is, the polarizing plates are arranged in the orthogonal nicol state.

The retardation plates have refractive index anisotropy, and in the plane perpendicular to the light traveling direction they have a slow axis and a fast axis perpendicular to each other. The retardation plates have the function of providing a predetermined retardation between the light of predetermined wavelength that has passed through the slow axis and the light of predetermined wavelength that has passed through the fast axis (the retardation is a phase difference of λ/4, provided that the wavelength of the light is λ). The slow axis of each retardation plate is set to form approximately 45° with respect to the transmission axis of the corresponding polarizing plate.

The angles mentioned above in connection with the polarizers and retardation plates may include errors caused for attaining desirable operations and errors attributable to the manufacturing process. For example, the above-mentioned angle of approximately 45° is assumed to include an angle range of 45°±5°. For example, being "perpendicular" is assumed to include an angle range of 90°±5°.

Figure 5:
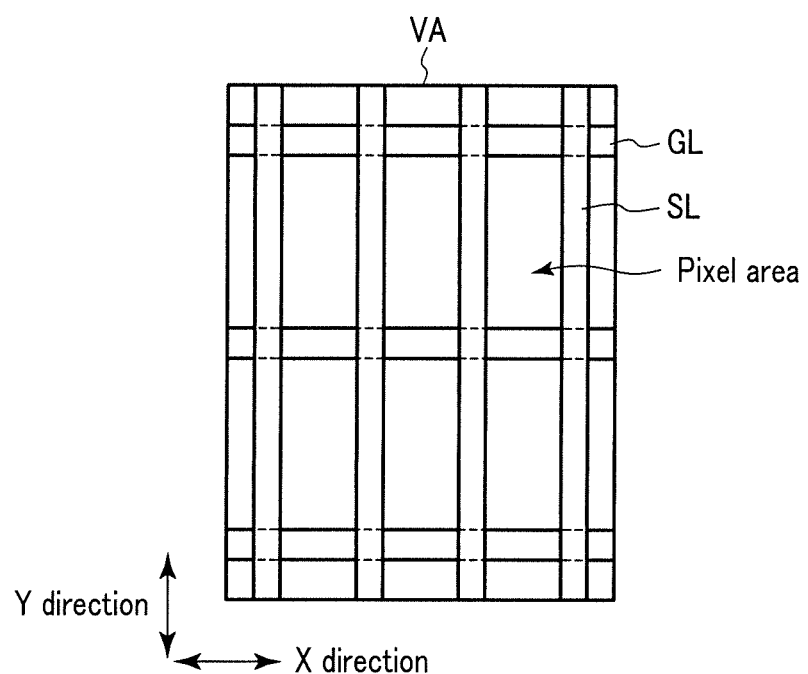
FIG. 5 is a schematic view of the display area of a liquid crystal display.

FIG. 5 is a schematic view of the display area VA of the liquid crystal display 12. A plurality of scanning lines GL extending in the row direction (X direction) and a plurality of signal lines SL extending in the column direction (Y direction) are arranged in the display area VA. The region surrounded by the adjacent two scanning lines GL and the adjacent two signal lines SL is a pixel area.

FIG. 6 is a circuit diagram of a pixel array. The liquid crystal display 12 includes a pixel array in which a plurality of pixels are arranged in a matrix. In FIG. 6, four pixels 40 are shown.

The pixel 40 includes a switching element 41, a liquid crystal capacitor (liquid crystal element) Clc and a storage capacitor Cs. The switching element 41 is, for example, a thin film transistor (TFT) or an n-channel TFT.

The source of TFT 41 is electrically connected to a signal line SL. The gate of TFT 41 is electrically connected to a scanning line GL. The drain of TFT 41 is electrically connected to the liquid crystal capacitor Clc. The liquid crystal capacitor Clc serving as a liquid crystal element includes a pixel electrode, a common electrode, and a liquid crystal layer sandwiched between these two electrodes.

The storage capacitor Cs is connected in parallel with the liquid crystal capacitor Clc. The storage capacitor Cs functions to suppress potential variations at the pixel electrode and to retain a driving voltage applied to the pixel electrode until the driving voltage corresponding to the next signal is applied. The storage capacitor Cs includes a pixel electrode, a storage electrode, and an insulating layer sandwiched between these two electrodes. The common electrode and the storage electrode are applied with a common voltage Vcom.

The liquid crystal display 12 includes a scanning driver 42, a signal driver 43 and a common voltage supply circuit 44.

The scanning driver 42 is connected to a plurality of scanning lines GL. Based on a vertical control signal supplied from a control circuit (not shown), the scanning driver 42 supplies the pixel array with a scanning signal used for turning on or off the switching elements included in the pixels.

The signal driver 43 is connected to a plurality of signal lines SL. The signal driver 43 receives a horizontal control signal and image data from the control circuit. Based on the horizontal control signal, the signal driver 43 supplies the pixel array with a gradation signal (driving voltage) corresponding to the image data.

The common voltage supply circuit 44 generates a common voltage Vcom and applies it to the pixel array. For example, the liquid crystal display 12 performs inversion driving (AC driving), in which the polarity of the electric field applied between the pixel electrode and common electrode (which sandwich the liquid crystals) is inverted in a predetermined period. In the inversion driving, the polarity of a common voltage Vcom and the polarity of a driving voltage are inverted in a predetermined period.

[3] First Embodiment

Figure 7:
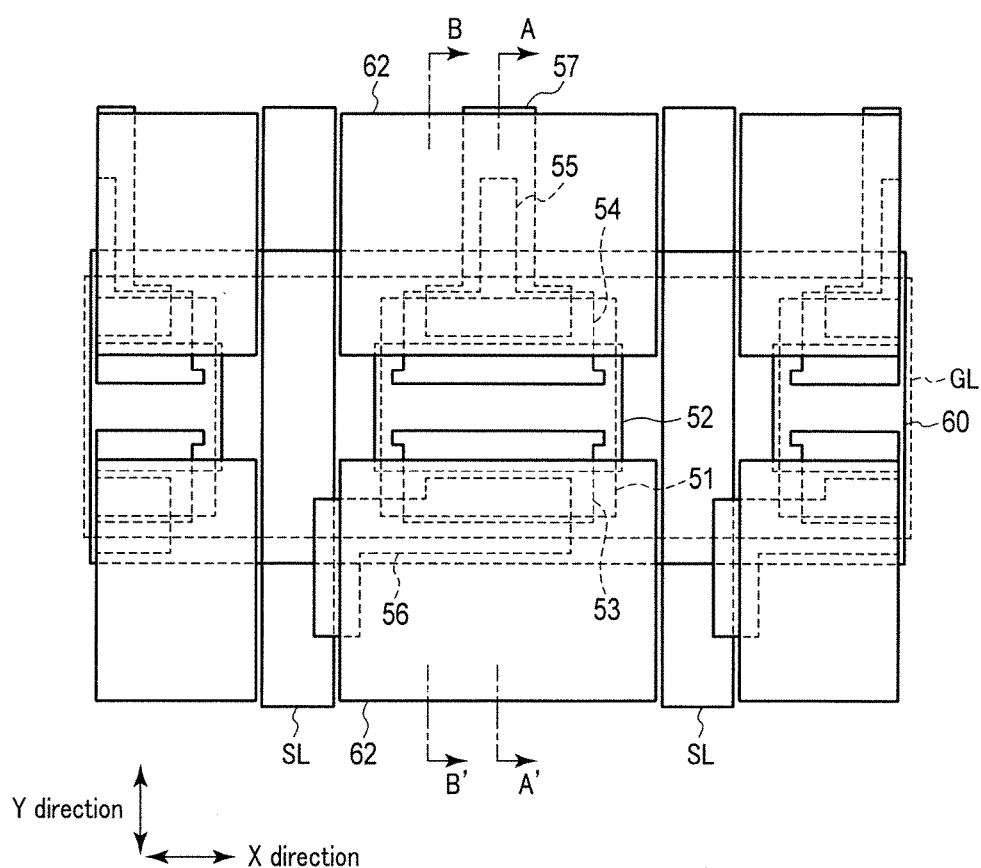
FIG. 7 is a plan view of a liquid crystal display according to the first embodiment.
Figure 8:
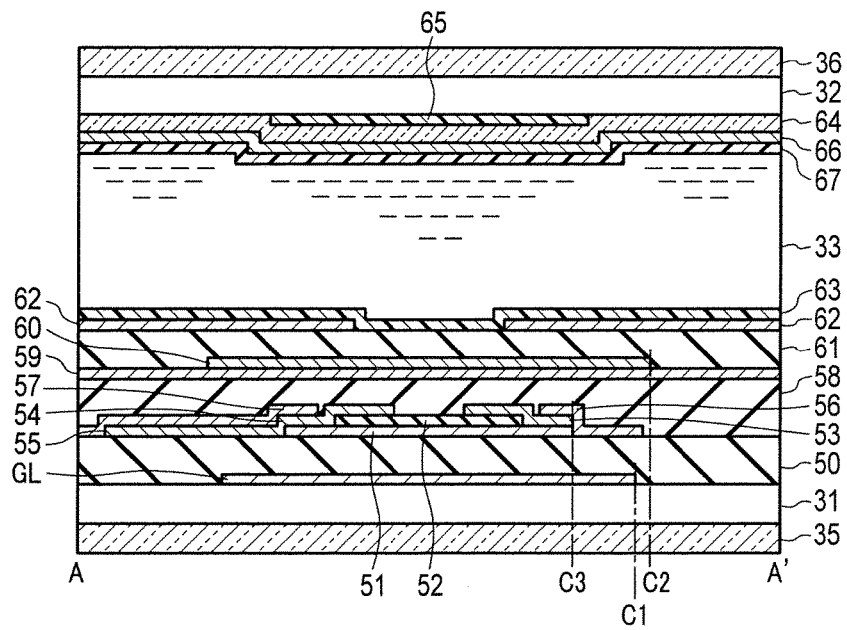
FIG. 8 is a sectional view of the liquid crystal display taken along line A-A' of FIG. 7.
Figure 9:
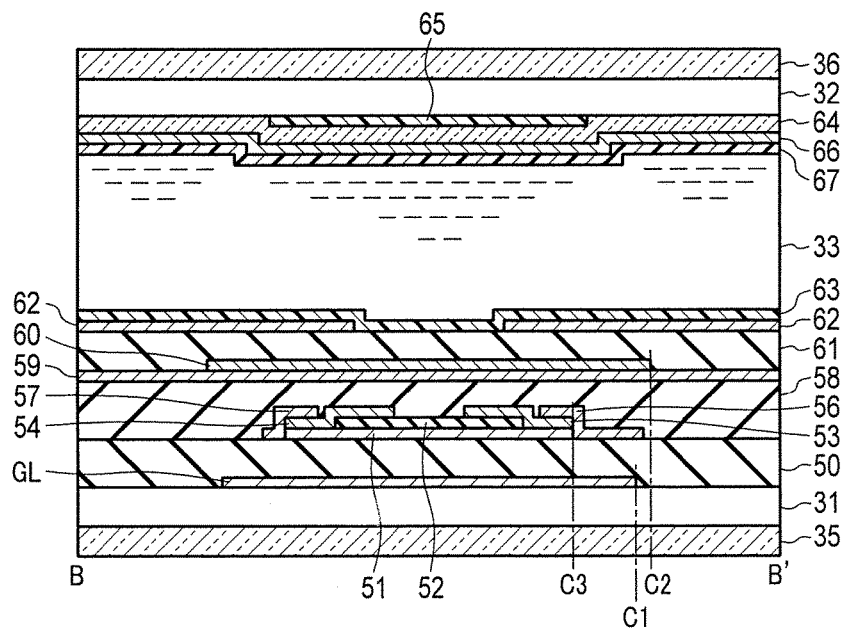
FIG. 9 is a sectional view of the liquid crystal display taken along line B-B' of FIG. 7.

Next, a description will be given of a detailed structure of the liquid crystal display 12. FIG. 7 is a plan view of the liquid crystal display 12 according to the first embodiment. FIG. 8 is a sectional view of the liquid crystal display taken along line A-A' of FIG. 7. FIG. 9 is a sectional view of the liquid crystal display 12 taken along line B-B' of FIG. 7. FIG. 7 is a plan view in which TFT 41 and its neighboring region are displayed. In FIG. 5, TFT 41 is arranged between the adjacent two source lines SL and on a scanning line GL.

The scanning line GL functioning as the gate electrode of TFT 41 is provided on that side of the TFT substrate 31 which is closer to the liquid crystal layer 33. In the present specification, the scanning line may be referred to as a gate electrode as well. Insulating layer 50 serving as the gate insulating film of TFT 41 is provided on the gate electrode GL.

A semiconductor layer (e.g., amorphous silicon layer) 51 is provided on insulating layer 50. A protective film 52 is provided on part of the semiconductor layer 51. The protective film 52 has the function of protecting the semiconductor layer 51 when an electrode on the semiconductor layer 51 is etched. The protective film 52 extends from the center of the semiconductor layer 51 to the X-direction ends thereof and covers the region between a source electrode and a drain electrode, mentioned later.

The source electrode 53 and the drain electrode 54 are provided on the semiconductor layer 51 and the protective film 52 such that they are separate from each other in the Y direction. The source electrode 53 and the drain electrode 54 are provided such that they are in contact with the semiconductor layer 51. The gate electrode GL, the gate insulating film (insulating layer 50), the semiconductor layer 51, the source electrode 53 and the drain electrode 54 jointly constitute TFT 41.

Connecting electrode 56, which electrically connects the source electrode 53 and the source line SL, is provided on insulating layer 50. The source line SL is provided on insulating layer 50 such that the source line SL extends in the Y direction.

Connecting electrode 55 extending from the drain electrode 54 in the Y direction is provided on insulating layer 50. Connecting electrode 57 extending in the Y direction is provided on the drain electrode 54 and connecting electrode 55. Connecting electrode 55 and connecting electrode 57 are provided to electrically connect the drain electrode 54 and the pixel electrode. Connecting electrode 57 is electrically connected to the pixel electrode by way of a contact (not shown).

Insulating layer 58 is provided on TFT 41 and the electrodes connected to TFT 41. A storage electrode 59 constituting the storage capacitor Cs is provided on insulating layer 58. When viewed in the plan view, the storage electrode 59 overlaps the pixel electrode at least in part. In order to prevent an unnecessary electric field from being applied to the liquid crystals due to the voltage for operating TFT 41, the storage electrode 59 to which the common voltage Vcom is applied should preferably cover TFT 41. In the present embodiment, the storage electrode 59 as a planar electrode is formed entirely in the display area VA and has a plurality of openings (not shown) through which contacts for electrical connection between the pixel electrode and the drain electrode are made to pass. That is, the storage electrode 59 is entirely formed in the region that is shown in the plan view of FIG. 7.

A portion of the storage electrode 59 which overlaps the pixel electrode constitutes storage capacitor Cs, together with the pixel electrode. A portion of the storage electrode 59 which overlaps the gate electrode, source electrode and drain electrode has a function of preventing the gate electrode, source electrode and drain electrode from capacitively coupling with the pixel electrode. Because of this, even if the voltages of the gate electrode, source electrode and drain electrode vary during the operation of TFT 41, the electric field applied to the liquid crystal layer 33 is prevented from varying.

A light-shielding film 60 for shielding TFT 41 from light is provided on the storage electrode 59. The light-shielding film 60 is formed along the gate electrode GL and extends in the X direction. In the first embodiment, the width of the light-shielding film 60 (i.e., the length as measured in the Y direction) is greater than the width of the gate electrode GL. Because of this structure, the light-shielding film 60 can cover TFT 41 (namely, the gate electrode GL, semiconductor layer 51, source electrode 53 and drain electrode 54).

Insulating layer 61 is provided on the storage electrode 59 and the light-shielding film 60. A pixel electrode 62 is provided on insulating layer 61 at a position corresponding to each pixel. The pixel electrode 62 has a planar shape which is substantially the same as the pixel area shown in FIG. 6. As described above, the pixel electrode 62 is electrically connected to connecting electrode 57 by way of a contact.

The pixel electrode 62 is overlaid with an alignment film 63. The alignment film 63 controls the alignment of the liquid crystal layer 33.

Color filters 64 are provided on that side of the CF substrate 32 which is closer to the liquid crystal layer 33. The color filters 64 include a plurality of coloring filters (coloring members). Specifically, the color filters 64 include a plurality of red filters, a plurality of green filters and a plurality of blue filters. General color filters include filters of light's three primary colors, namely, red (R), green (G) and blue (B). An adjacent set of filters of R, G and B colors functions as a unit of display (a pixel). Each of the single-color portions of one pixel is a minimum drive unit referred to as a sub pixel (sub picture element). The TFT 41 and the pixel electrode 62 are provided for each sub pixel. In the descriptions below, the sub pixels will be referred to simply as pixels, provided that the pixels and the sub pixels do not have to be discriminated from each other.

A light-shielding black mask (light-shielding film, black matrix) 65 is provided on the CF substrate 32 and on the boundaries between the pixel areas that are adjacent in the X direction and Y direction. The black mask 65 is formed in a lattice pattern and virtually covers the regions other than the pixel areas shown in FIG. 5. The black mask 65 serves to shield the unwanted light between the coloring members and to enhance the contrast.

A common electrode 66 is provided on the color filters 64. The common electrode 66 as a planar electrode is provided entirely in the display area VA. The common electrode 66 is overlaid with an alignment film 67. The alignment film 67 controls the alignment of the liquid crystal layer 33.

Connecting electrode 56, connecting electrode 57, the storage electrode 59, the pixel electrode 62 and the common electrode 66 are transparent electrodes which are made, for example, of an indium tin oxide (ITO). The protective film 52 and insulating layers 50, 58 and 61 are made of a transparent insulating material; they are formed of silicon nitride (SiN), for example. The light-shielding film 60 is made of a conductive material; it is made, for example, of chromium (Cr), molybdenum (Mo), an alloy containing at least one kind of these materials, or chromium oxide. The black mask 65 is a laminated film including chromium oxide and chromium stacked in order; alternatively, the black mask 65 is made of black resin. The source electrode 53, the drain electrode 54, connecting electrode 55, the gate electrode GL and the signal line SL are made, for example, of one of aluminium (Al), molybdenum (Mo), chromium (Cr) and tungsten (W), or an alloy containing at least one kind of these materials. It is desirable that the source electrode 53, the drain electrode 54, connecting electrode 55, the gate electrode GL and the signal line SL be made of a conductive material having a large optical density (OD) value.

In the liquid crystal display 12 of the first embodiment of the above structure, the light-shielding film 60 covers TFT 41. The width of the light-shielding film 60 (i.e., the length as measured in the Y direction) is greater than the width of the gate electrode GL. The distance between the end of the source electrode 53 and the end of the drain electrode 54 is shorter than the width of the light-shielding film 60. The gate electrode GL, the light-shielding film 60, the semiconductor layer 51, the protective film 52 and the black mask 65 are arranged such that their centers in the Y direction are the same. In actuality, errors resulting from the manufacturing process may have effects on the positional relationships, but such errors are encompassed in the present embodiment. In FIGS. 8 and 9, normal line C1 passing an end of the gate electrode GL, normal line C2 passing an end of the light-shielding film 60 and normal line C3 passing an end of the source electrode 53 are depicted. Normal line C1 is located more inward than normal line C2. Normal line C3 is located more inward than normal lines C1 and C2.

As shown in FIG. 10, the illumination light emitted from the light source unit 11 is incident on the liquid crystal display 12 from the TFT substrate 31 at incidence angle $\theta_0$. It is assumed that the refraction angle of the liquid crystal display 12 is $\theta_1$. The illumination light reflected by the black mask 65 is shielded by the light-shielding film 60 and is not incident on TFT 41 (particularly the semiconductor layer 51). Since the illumination light reflected by the light-shielding film 60 undergoes repeated reflection and attenuates, it is hardly incident on the semiconductor layer 51.

The extraneous light is incident on the liquid crystal display 12 from the CF substrate 32 at incidence angle $\theta_0$. Since the extraneous light reflected by connecting electrode 55 undergoes repeated reflection and attenuates, it is hardly incident on the semiconductor layer 51. As shown in FIG. 11, the extraneous light reflected by the gate electrode GL undergoes repeated reflection and attenuates, it is hardly incident on the semiconductor layer 51.

Where light is incident on the liquid crystal display 12 at incidence angle $\theta_0$, the intensity of the light incident on TFT 41 (particularly the semiconductor layer 51) can be decreased. Because of this, the photo-leakage current of TFT 41 can be decreased.

[4] Second Embodiment

Figure 12:
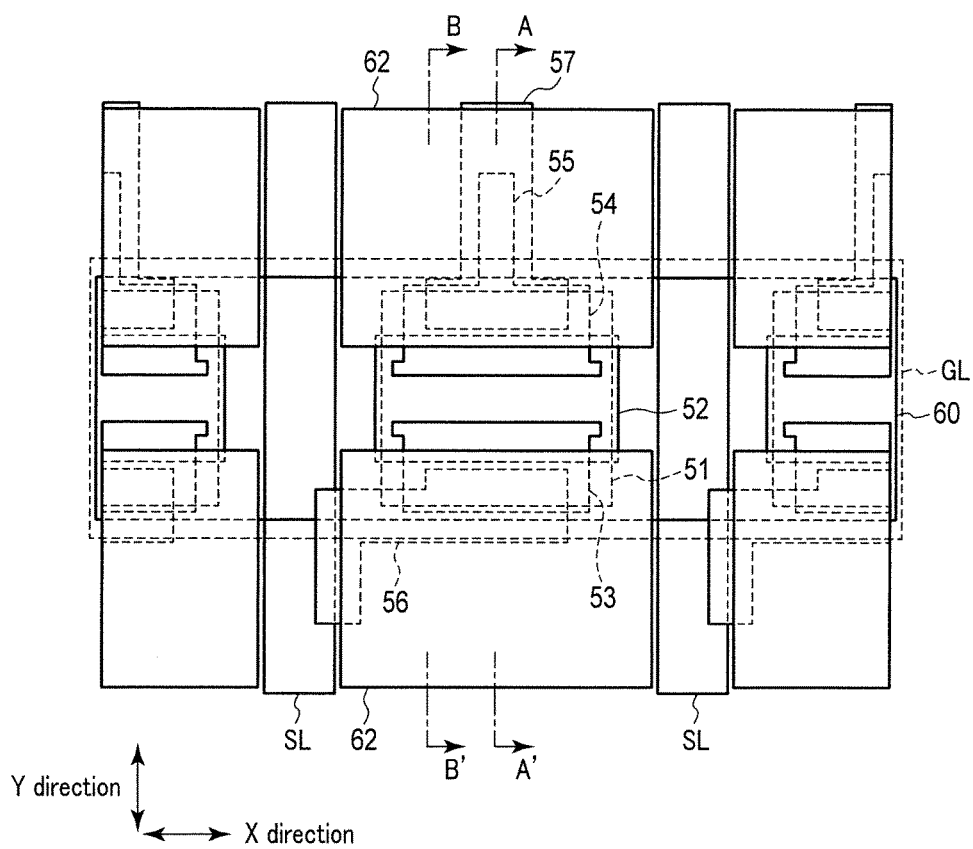
FIG. 12 is a plan view of a liquid crystal display according to the second embodiment.

Next, a description will be given of a detailed structure of a liquid crystal display 12 according to the second embodiment. FIG. 12 is a plan view of the liquid crystal display 12 according to the second embodiment. FIG. 13 is a sectional view of the liquid crystal display 12 taken along line A-A' of FIG. 12. FIG. 14 is a sectional view of the liquid crystal display 12 taken along line B-B' of FIG. 12.

In the second embodiment, the width of the light-shielding film 60 is less than the width of the gate electrode GL. The length between the ends of the source electrode 53 and the length between the ends of the drain electrode 54 are less than the width of the gate electrode GL. The width of the black mask 65 is less than the width of the gate electrode GL.

In FIGS. 13 and 14, normal line C1 passing an end of the gate electrode GL, normal line C2 passing an end of the light-shielding film 60 and normal line C3 passing an end of the source electrode 53 are depicted. Normal line C2 is located more inward than normal line C1. Normal line C3 is located more inward than normal lines C1 and C2.

Figure 15:
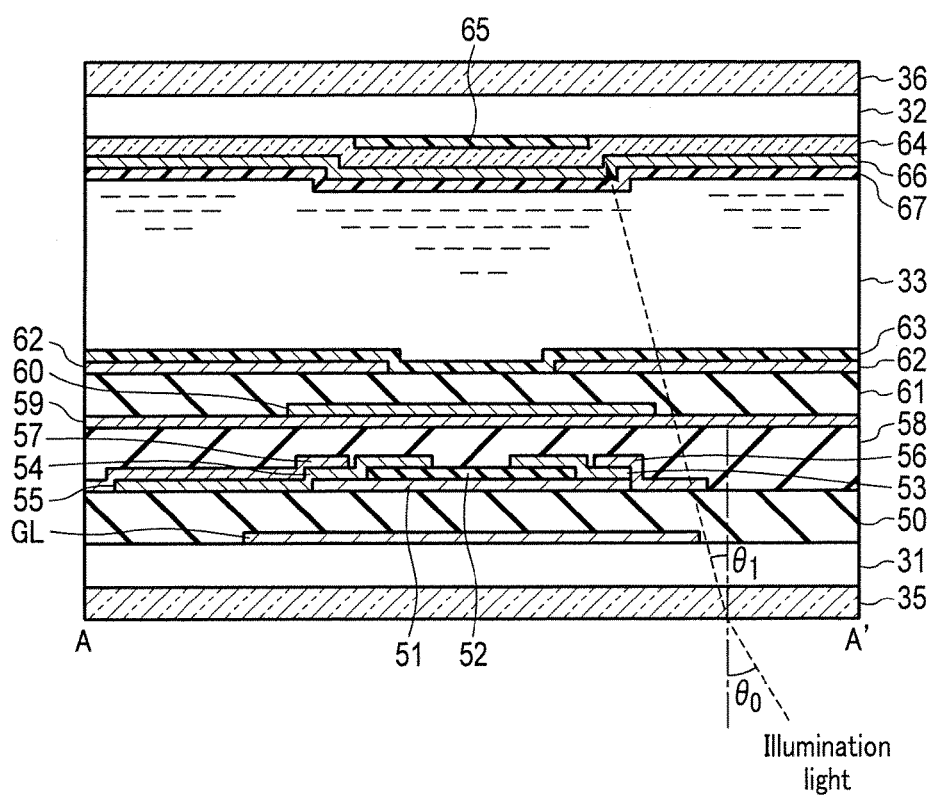
FIG. 15 illustrates light incident on the liquid crystal display of the second embodiment.

As shown in FIG. 15, the illumination light emitted from the light source unit 11 is incident on the liquid crystal display 12 from the TFT substrate 31 at incidence angle $\theta_0$. It is assumed that the refraction angle of the liquid crystal display 12 is $\theta_1$. The illumination light traveling near an end of the gate electrode GL is not reflected by the light-shielding film 60. Because of this, the amount of illumination light falling on TFT 41 (particularly, the semiconductor layer 51) can be decreased further.

Figures 16, 17:
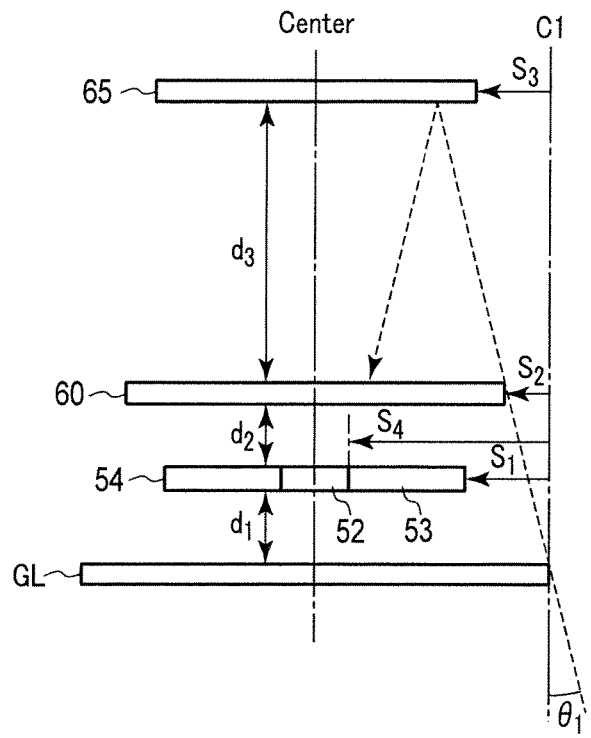
FIG. 16 is a schematic diagram illustrating the conditions of a light-shielding film, a source electrode and a black mask.
FIG. 17 shows how an incidence angle and a refraction angle are related in a liquid crystal display.

FIG. 16 is a schematic diagram illustrating the conditions of the light-shielding film 60, the source electrode 53 and the black mask 65.

Distance $d_1$ is the distance between the gate electrode GL and the source electrode 53. Distance $d_1$ is the total of the thicknesses of insulating layer 50 and the semiconductor layer 51. Since the thickness of insulating layer 50 is sufficiently more than the thickness of the semiconductor layer 51, distance $d_1$ can be regarded as being approximately equal to the thickness of insulating layer 50 ($d_1 \approx$ thickness of insulating layer 50).

Distance $d_2$ is the distance between the source electrode 53 and the light-shielding film 60. Distance $d_2$ is the total of the thicknesses of insulating layer 58 and the storage electrode 59. Since the thickness of insulating layer 58 is sufficiently more than the thickness of the storage electrode 59, distance $d_2$ can be regarded as being approximately equal to the thickness of insulating layer 58 ($d_2 \approx$ thickness of insulating layer 58).

Distance $d_3$ is the distance between the light-shielding film 60 and the black mask 65. Distance $d_3$ is the total of the thicknesses of insulating layer 61, the pixel electrode 62, alignment film 63, the liquid crystal layer 33, alignment film 67, the common electrode 66 and the color filter 64. Since the thicknesses of insulating layer 61, the liquid crystal layer 33 and the color filter 64 are sufficiently more than the thicknesses of the pixel electrode 62, the common electrode 66 and alignment films 63 and 67, distance $d_3$ can be regarded as being approximately equal to the total of the thicknesses of insulating layer 61, the liquid crystal layer 33 and the color filter 64 ($d_3 \approx$ thickness of insulating layer 61+thickness of liquid crystal layer 33+thickness of color filter 64).

Distances $S_1$, $S_2$ and $S_3$ are defined with reference to normal line C1 passing an end of the gate electrode GL. Distance $S_1$ is the distance between normal line C1 and the source electrode 53. Distance $S_2$ is the distance between normal line C1 and the light-shielding film 60. Distance $S_3$ is the distance between normal line C1 and the black mask 65.

The circular polarizer, the glass substrate, the alignment films, the color filter, the liquid crystal layer and the semiconductor layer (amorphous silicon) have substantially the same refractive index, which is approximately 1.5. Let us assume that the refraction angle of the circular polarizer, the glass substrate, the alignment films, the color filter, the liquid crystal layer and the semiconductor layer (amorphous silicon) is $\theta_{11}$. The transparent electrode (ITO) and the insulating layers (silicon nitride) have substantially the same refractive index, which is approximately 1.8. Let us assume that the refraction angle of the transparent electrode (ITO) and the insulating layers (silicon nitride) is $\theta_{12}$. The incidence angle is $\theta_0$.

FIG. 17 shows how the incidence angle and the refraction angle are related in the liquid crystal display 12. If it is assumed that the incidence angle (tilt angle) is $\theta_0$, the refraction angle in the liquid crystal display 12 is $\theta_1$ and the refractive index is n, then $\sin \theta_0 = n \cdot \sin \theta_1$ is satisfied. $\theta_{11}$ indicates a refraction angle when n=1.5, and $\theta_{12}$ indicates a refraction angle when n=1.8. The fractions of the refraction angles shown in FIG. 17 are rounded.

Distance $S_1$ satisfies the condition that illumination light not shielded by the gate electrode GL is not reflected by the source electrode 53. Therefore, the illumination light reflected by the source electrode 53 is prevented from being incident on the semiconductor layer 51. That is, distance $S_1$ satisfies the following formula (1):

$$S_1 > d_1 \cdot \tan \theta_{12} \tag{1}$$

Distance $S_2$ satisfies the condition that the illumination light not shielded by the gate electrode GL is not reflected by the light-shielding film 60. Therefore, the illumination light reflected by the light-shielding film 60 is prevented from being incident on the semiconductor layer 51. That is, distance $S_2$ satisfies the following formula (2):

$$S_2 > (d_1 + d_2) \cdot \tan \theta_{12} \tag{2}$$

The condition of distance $S_3$ is that it is larger than 0. That is, an end of the black mask 65 is located more inward than an end of the gate electrode GL (i.e., closer to the center of the gate electrode GL). In other words, the width of the black mask 65 is less than the width of the gate electrode GL. Therefore, the aperture ratio is kept from decreasing. In consideration of the margin for misalignment when the TFT substrate 31 and the CF substrate 32 are pasted in the manufacturing process, distance $S_3$ should be preferably longer than distance $S_2$.

Assuming that the distance from normal line C1 to the inward end of the source electrode 53 (i.e., the end closer to the drain electrode 54) is $S_4$, distances $S_1$, $S_2$ and $S_3$ are shorter than $S_4$. If distances $S_2$ and $S_3$ are longer than $S_4$, light would fall on the semiconductor layer 51 from above in the Figure.

With respect to the drain electrode 54, it is configured to satisfy the same condition as the source electrode 53 and therefore satisfies the same positional relationships with reference to the light-shielding film 60, the gate electrode GL and the black mask 65. Even if light is incident from the drain electrode 54 at an oblique angle, the same operation and effect as mentioned above in relation to the source electrode 53 are attained.

[5] Advantages

As detailed above, according to the present embodiment, the head-up display device 10 is provided with the liquid crystal display 12, and the illumination light emitted from the light source unit 11 is obliquely incident on the liquid crystal display 12. The liquid crystal display 12 includes a storage electrode 59 provided above the switching element (TFT) 41, with insulating layer 58 interposed, and a light-shielding film 60 provided on the storage electrode 59.

According to the present embodiment, therefore, the light from above the switching element 41 (from the side of the CF substrate 32) is prevented from being incident on the switching element 41 (particularly, the semiconductor layer 51). Since the switching element serves to reduce the photo-leakage current, the image quality of the liquid crystal display 12 can be improved.

In addition, the width of the light-shielding film 60 (i.e., the length as measured in the Y direction) is set to be less than the width of the gate electrode GL. With this structure, the illumination light reflected by the light-shielding film 60 is prevented from being incident on the semiconductor layer 51.

The length between the ends of the source electrode 53 and drain electrode 54 is set to be less than the width of the gate electrode GL. With this structure, the light reflected by the source electrode 53 and the drain electrode 54 is prevented from being incident on the semiconductor layer 51.

The black mask 65 is provided for the CF substrate 32, and the width of the black mask 65 is set to be less than the width of the gate electrode GL. Therefore, the aperture ratio (transmission factor) is kept from decreasing.

The light-shielding film 60 is made of a conductive material and is electrically connected to the storage electrode 59. In other words, the light-shielding film 60 is applied with the same voltage as the storage electrode 59 (common voltage Vcom). With this structure, the light-shielding film 60 does not cause an unnecessary electric field which may be applied to the liquid crystal layer 33.

In the present specification, the terms "plate" and "film" are exemplary expressions of members and do not limit the structures of the members. For example, the retardation plates are not limited to plate-like members; they may be films or any other types of members having the function described in the specification. The polarizers are not limited to plate-like members; they may be films or any other types of members having the function described in the specification.

The present invention is not limited to the above-described embodiments, and can be modified in various manners when reduced to practice, without departing from the gist of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are omitted, the embodiment made up of the resultant structural elements can be extracted as an invention.

What is claimed is:

1. A liquid crystal display comprising:
   a first substrate and a second substrate which face each other and which are provided such that light emitted from a light source is obliquely incident on a surface of each of the first and second substrates;
   a liquid crystal layer provided between the first substrate and the second substrate;
   a switching element provided on the first substrate and including a gate electrode;
   a first light-shielding film provided above the switching element, with a first insulating layer interposed;
   a pixel electrode provided above the first light-shielding film, with a second insulating layer interposed; and
   a second light-shielding film provided on the second substrate and in a boundary region between adjacent pixels, and located above the switching element,
   wherein the first light-shielding film has a width less than that of the gate electrode.

2. The liquid crystal display according to claim 1, wherein following formula is satisfied $$S_1 > d_1 \cdot \tan \theta$$

where $S_1$ is a distance between a normal line passing an end of the gate electrode and an end of the first light-shielding film, $d_1$ is a distance from the gate electrode to the first light-shielding film, and $\theta$ is a refraction angle of incident light.

3. The liquid crystal display according to claim 1, further comprising:

a storage electrode provided between the first insulating layer and the first light-shielding film, wherein the first light-shielding film is made of a conductive material and is electrically connected to the storage electrode.

4. A head-up display device comprising:
a liquid crystal display of claim 1;
the light source; and
a reflective member which projects light having passed through the liquid crystal display onto a display member.

5. A liquid crystal display comprising:
a first substrate and a second substrate which face each other and which are provided such that light emitted from a light source is obliquely incident on a surface of each of the first and second substrates;
a liquid crystal layer provided between the first substrate and the second substrate;
a switching element provided on the first substrate and including a gate electrode;
a first light-shielding film provided above the switching element, with a first insulating layer interposed;
a pixel electrode provided above the first light-shielding film, with a second insulating layer interposed; and
a second light-shielding film provided on the second substrate and in a boundary region between adjacent pixels, and located above the switching element,
wherein the second light-shielding film has a width less than that of the gate electrode.

6. The liquid crystal display according to claim 5, further comprising:
a storage electrode provided between the first insulating layer and the first light-shielding film,
wherein the first light-shielding film is made of a conductive material and is electrically connected to the storage electrode.

7. A liquid crystal display comprising:
a first substrate and a second substrate which face each other and which are provided such that light emitted from a light source is obliquely incident on a surface of each of the first and second substrates;
a liquid crystal layer provided between the first substrate and the second substrate;
a switching element provided on the first substrate and including a gate electrode;
a first light-shielding film provided above the switching element, with a first insulating layer interposed;
a pixel electrode provided above the first light-shielding film, with a second insulating layer interposed; and
a second light-shielding film provided on the second substrate and in a boundary region between adjacent pixels, and located above the switching element,
wherein the switching element includes a semiconductor layer provided above the gate electrode, with a third insulating layer interposed, and a source electrode and a drain electrode which are provided on the semiconductor layer, and
the source electrode and the drain electrode have outward ends located inward of an end of the gate electrode.

8. The liquid crystal display according to claim 7, wherein following formula is satisfied $$S_2 > d_2 \cdot \tan \theta$$

where $S_2$ is a distance between a normal line passing the end of the gate electrode and an end of the source electrode, $d_2$ is a distance from the gate electrode to the source electrode, and $\theta$ is a refraction angle of incident light.

9. The liquid crystal display according to claim 7, further comprising:
a storage electrode provided between the first insulating layer and the first light-shielding film,
wherein the first light-shielding film is made of a conductive material and is electrically connected to the storage electrode.

* * * * *